US005997456A

United States Patent [19]

Butters et al.

[11] Patent Number: 5,997,456

[45] Date of Patent: Dec. 7, 1999

[54] HIGH RELEASE COATINGS FOR PRINTING AND COATING ROLLERS

[75] Inventors: Gary S. Butters, Greenfield; Peter A. Patterson, Racine; Gary A. Koerber, Union Grove, all of Wis.

[73] Assignee: American Roller Company, Union Grove, Wis.

[21] Appl. No.: 09/022,860

[22] Filed: Feb. 12, 1998

[51] Int. Cl.[6] .......... B23P 15/00

[52] U.S. Cl. .......... 492/56; 492/59

[58] Field of Search .......... 492/56, 59; 428/421; 355/255

[56] References Cited

U.S. PATENT DOCUMENTS

| | | | |
|---|---|---|---|
| 4,804,576 | 2/1989 | Kuge et al. | 492/56 |
| 5,153,660 | 10/1992 | Goto | 492/56 |
| 5,376,448 | 12/1994 | Suzuki et al. | 492/56 |
| 5,541,001 | 7/1996 | Vreeland et al. | 492/56 |
| 5,547,759 | 8/1996 | Chen et al. | 428/421 |
| 5,572,275 | 11/1996 | Jinzai | 492/56 |
| 5,582,885 | 12/1996 | Nakamura et al. | 492/56 |

FOREIGN PATENT DOCUMENTS

| | | |
|---|---|---|
| 195 29 809 | 2/1997 | Germany . |
| 5 717 1339 | 10/1982 | Japan . |
| 6 003 1856 | 2/1985 | Japan . |
| 6 314 2381 | 6/1988 | Japan . |
| WO94/16539 | 7/1994 | WIPO . |

OTHER PUBLICATIONS

"Tat' Coatings—An Engineering Guide to the Technology and Applications," May 15, 1997, Spray–Tech, Inc., P.O. Box 641, Sandy Hook, CT 06482.

"Anti–Graffiti Top Coat Series S–100," c. 1995, Spray–Tech, Inc., 15 Commerce Road, Newtown, CT 06470.

European Search Report dated Apr. 5, 1999 for PCT/US99/00926.

*Primary Examiner*—T. Cuda
*Attorney, Agent, or Firm*—Quarles & Brady LLP

[57] ABSTRACT

Coated rollers (10) with a hard, high release, non-marking, coating with excellent non-stick properties are disclosed for use as idler rollers, or as laminating, coating or printing rollers. The release coating comprises an outermost coat (15) which includes a silicone-epoxy emulsion in a water-based curing system that is sprayed or brushed on a roller core and then allowed to cure at room temperature. The release coating further comprises a primer coat (16) of silicone-epoxy in a water base that is also sprayed or brushed on the roller to form a coat and then allowed to cure at room temperature. Methods for making such rollers are also disclosed.

9 Claims, 2 Drawing Sheets

HIGH RELEASE COATINGS FOR PRINTING AND COATING ROLLERS

TECHNICAL FIELD

The present invention relates to non-stick coatings for machine rollers used in printing, laminating or coating operations.

DESCRIPTION OF THE BACKGROUND ART

Rollers with good non-stick (high-release, low energy) surfaces are required in the processing and handling of adhesives, inks, toners, coatings and other materials for a wide variety of applications. The materials to be released may be liquids or solids. Release may be achieved either by using materials with low surface energies, or by coating, wrapping or impregnating the surface with low energy materials.

Generally, materials that have good release properties tend to be relatively soft and need improvement in the area of abrasion resistance and durability. This is exemplified by silicones and Teflon which are two of the most widely used materials for high release applications. Silicones tend to have good release properties (low surface energy) but not good wear resistance. A use of an improved coating based on a fluoropolymer resin (DuPont "Supra Silverstone") for a fuser roller is disclosed in Chen et. al., U.S. Pat. No. 5,547,759. Such coatings may have improved durability, but may not exhibit the high release characteristics of silicone materials.

Rollers used for transporting solid webs, or used in nip positions generally need to be resistant to wear and abrasion in addition to providing high release properties.

A general object of the invention is to provide improved coatings for idler rollers and laminating rollers, in which the coatings provide excellent wear resistance, excellent release characteristics, are non-marking, and provide a variety of surface finishes. The coatings should also be easy to apply in manufacture of the rollers.

SUMMARY OF THE INVENTION

The invention relates to a roller having a coating comprising a silicone-epoxy mixture that is cured with a water-based curing process.

These coatings combine the release of silicones with the hardness and durability of epoxies. These coatings provide low surface energies and low tape release loads.

The coated rollers have excellent wear resistance, excellent release characteristics, are non-marking, and provide a variety of surface finishes. The coatings are also easy to apply in manufacture of the roller and utilize water-based, as opposed to solvent-based, curing systems.

The invention provides a durable, high release, non-marking, hard coating for idler rollers which provides excellent non-stick properties, as well as superior wear and abrasion resistance compared to other release coverings. The coating allows molten plastics or tacky adhesives to release from the surface, reducing downtime, maintenance and waste.

The properties of the coated rollers are a combination of the composition and thickness of the release coating, as well as the texture and hardness of the substrate on which they are deposited. In its principal form, the substrates will be thermally sprayed metal, ceramic and cermet materials on metallic and resin-fiber composite cores. Other substrates such as rubber, and urethanes may also be used. The thermally sprayed substrates are used to improve the wear resistance, and control the texture of the surfaces.

The invention can be used in idler rollers for converting operations where the roller contacts tacky adhesives or molten plastics. The invention can also be used for idler rollers in adhesive printing applications. The invention can also be used for rollers used for feeding or guiding webs with hot melt adhesive that are to be adhered together. The invention can also be applied to laminating rollers, especially those handling pressure sensitive or heat set materials. The invention can also be used in equipment for embossing and calendaring of thermoplastic materials, where sticking is a problem. And, the invention can also be used with other types of printing, especially for laser printing using thermoplastic toner. These examples highlight the advantages of the present invention as well as the need for improved coated rollers made according to the present invention.

In a more detailed embodiment, a coated roller comprises a core having an outer surface roughness of at least approximately 50 microinches; and a coating disposed around the metal core in a thickness of less than about 10 mils; wherein the coating comprises i) a mixture of siloxane polymeric material and epoxy resin material ii) a water-based curing agent for said siloxane polymeric material and iii) a water-based curing agent for said epoxy resin material.

The invention also relates to methods of making coated rollers with good release, durability and release properties for the handling of adhesives, the method comprising the steps of processing an outer surface of a core to obtain a roughness of at least approximately 50 microinches; applying a coating over the core in a thickness of less than about 10 mils; wherein the coating comprises i) a mixture of siloxane polymeric material and epoxy resin material ii) a water-based curing agent for said siloxane polymeric material and iii) a water-based curing agent for said epoxy resin material; and allowing said coating to cure at room temperature.

The roller and method of the invention may optionally include a base layer of tungsten carbide, a ceramic or a gel coat for improvement of the wear characteristics of the top coat.

These and other objects of the present invention will become readily apparent upon further review of the following specification and the drawings which are incorporated herein and which describe and illustrate several preferred embodiments of the invention. Such embodiments are not, however, exhaustive of all possible embodiments, and therefore reference should be made to the claims which follow the description for the legal scope of the invention.

DETAILED DESCRIPTION OF THE PREFERRED EMBODIMENTS

Figure 1:
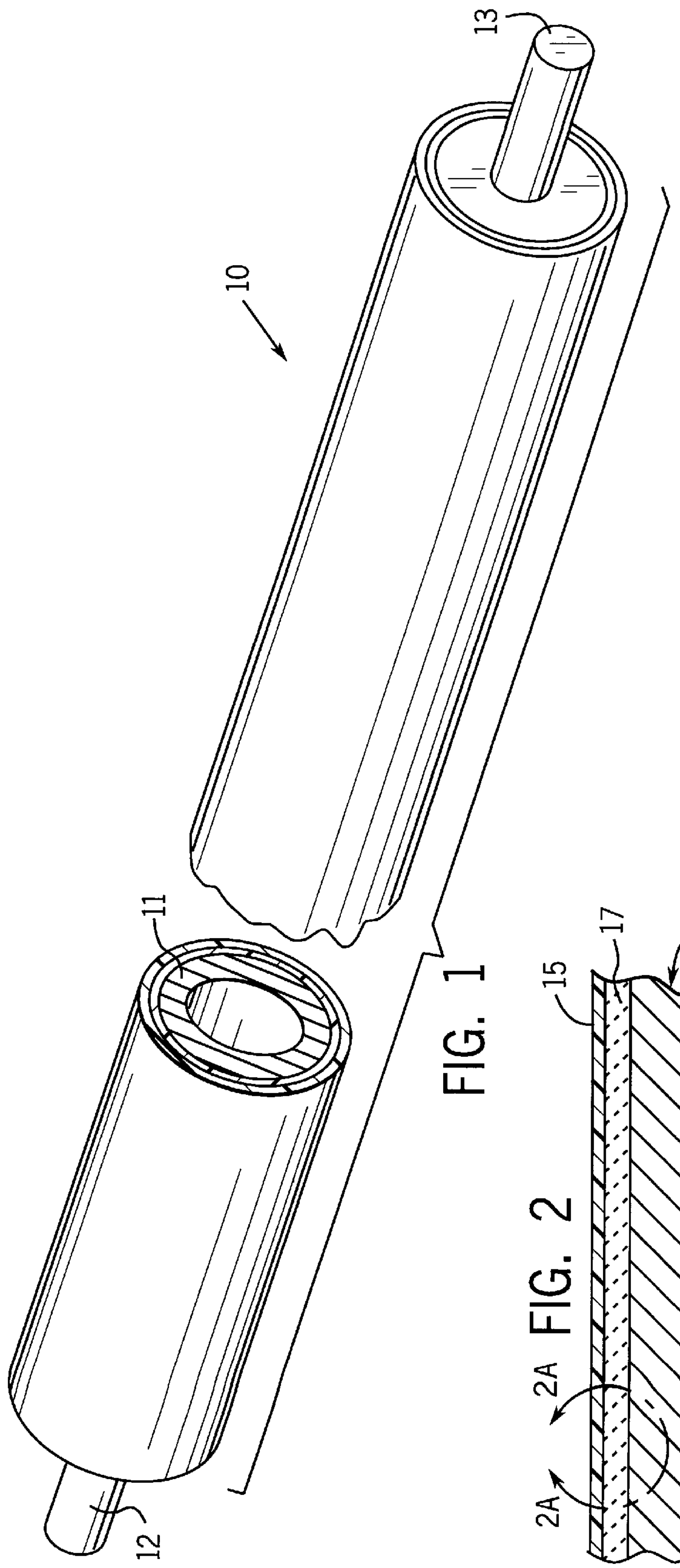
FIG. 1 is a perspective view of a first embodiment of a roller of the present invention.
Figure 2:
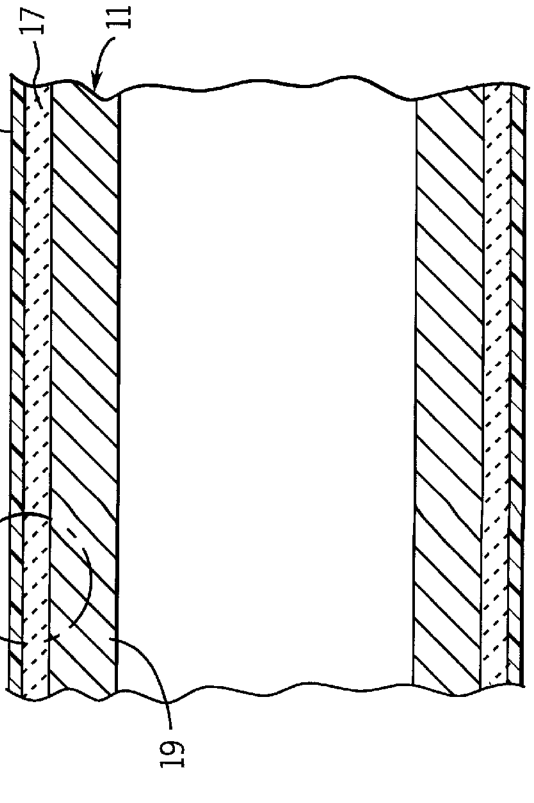
FIG. 2 is a longitudinal section view of the roller of FIG. 1.
Figure 2A:
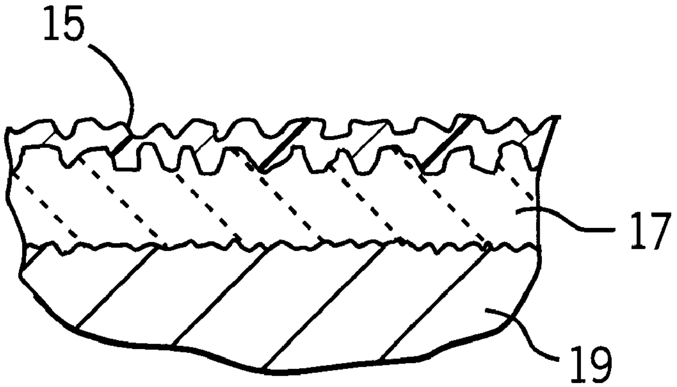
FIG. 2A is an enlarged, fragmentary view in section of a portion of FIG. 2 indicated by line 2A—2A in FIG. 2.

Referring to FIG. 1, an idler roller 10 for use in a printing machine has a hollow metal core 11, preferably of stainless steel, extending longitudinally between journals 12, 13 at opposite ends. Although stainless steel is the preferred material for the core, other materials such as low carbon steel, aluminum, a glass fiber reinforced material as disclosed in Carlson, U.S. Pat. No. 5,256,459, and ceramic coatings may be used in cores in other embodiments. An aluminum core should be grit blasted to remove surface oxides. The steel core 10, which has a side wall 19, is typically grit blasted on the outside to provide a surface 14 (FIG. 2A) with a roughness of 50–1000 microinches (Ra) for better adhesion of a top coat layer 15. Optionally, a base layer 17 of tungsten carbide or a ceramic can be thermally sprayed on the core 10. A gel coat may also be employed as a base layer 17. In cores with ceramic coatings, the coatings are applied to obtain a suitable roughness in the range of 50–1000 microinches (Ra).

A top coat is applied by brushing on or spraying a coating material 15, which is comprised in part by a siloxane polymer material that is non-sticky, hydrophobic and lubricous and an epoxy resin material as 47% (by weight) in an "A" component. The remaining portion of the "A" component is 3% 2-propoxyethanol and 50% other ingredients. The "A" component has the appearance of an opaque white liquid with a mild odor.

The top coat material 15 also includes a "B" component comprising 55% by weight of polyamine solution for curing of the epoxy material, 30% by weight 2-propoxyethanol, and 15% by weight methyl alcohol. The "B" component has the appearance of clear amber liquid with a solvent odor. The coating material 15 also includes a "C" component comprising 0.5% propanol, 0.25% methanol, 13% pigment and 86.25% other ingredients, including a cross linking agent for curing the silicone material in the "A" component. The "X" component has the appearance of a pigmented opaque liquid.

To provide the coating, six parts of the "A" component are mixed with one part of the "X" component, and then this resulting mixture is mixed with one part of the "B" component before spraying or brushing on the core 11. Preferably, the coating material 15 is applied in multiple passes to build up a layer 1–4 mils thick. The coating is allowed to dry (2 hours) and cure (5 days total) at room temperature and humidity (70° F., 65% relative humidity).

Specific examples of coatings which can be used to carry out the invention are the S-100 Topcoat Series and the S-110 Coating Series available from Spray-Tech, Inc, Newtown, Conn. These coatings have been used as anti-graffiti coatings for concrete, metal, wood and plastics.

The coating is not recommended for continuous use at temperatures exceeding 275° F.

The base layer 17 has sufficient roughness that it receives portions of the outer layer material 15 in valleys formed in the base layer 17. Under severe wear conditions, the outer layer 15 may wear until peaks of the base layer 17 are exposed, however, material in the outer layer 15 will be retained in the valleys seen in FIG. 2A to provide a useable roller 10 with extended wear characteristics. The base layer 17 shown in FIG. 2A has twice the thickness of the top coating, and would have at least the thickness of the top coating 15 in other embodiments.

Figure 3:
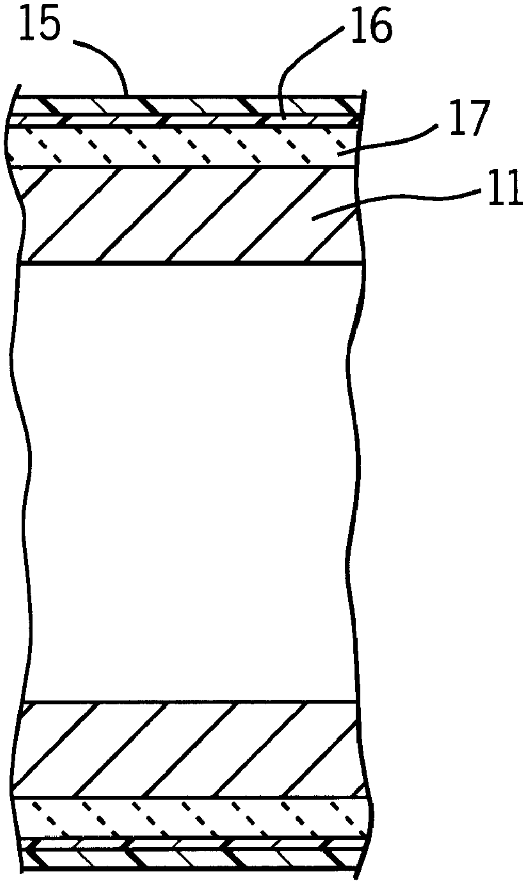
FIG. 3 is a fragmentary sectional view of a second embodiment of a roller of the present invention.

In a second embodiment illustrated in FIG. 3, a primer coat 16 is applied before the top coat 15 mentioned above. The primer coat 16 uses an "A" component similar to that described above and a "B" component similar to that described above, but not an "X" component. It is mixed four parts of the "A" component to one part of the "B" component and is then sprayed or brushed on in a layer 4 to 8 mils thick. It has similar curing characteristics to the outer coating 15. A specific example of a primer which can be used to carry out the invention is one of the series of S-110 Prime Coat Series available from Spray-Tech, Inc., Newtown, Conn.

The following are specific examples of the invention.

EXAMPLE 1

A stainless steel tube measuring 1.19 inch in diameter and 15.16 inches long was used as the substrate for the first example. The surface of the tube was divided into three sections. The surface of the first section was grit blasted to obtain a mean roughness (Ra) of approximately 150 microinches. The surface of the middle section was cleaned with a solvent rag, and no other surface preparation was done to this section. The mean surface roughness was approximately 30 microinches. The surface of the third section was covered with the prime coat 16 which was applied by brushing on to the surface. After the prime coat 16 was dry, the three sections of the sample tube were sprayed with S-100 white-pigmented mixture using a NAPA air spray gun. A thickness of 3–4 mils (0.003 to 0.004 inches) was deposited on the surface of the tube. The coating was left to cure for five days at room temperature before being evaluated.

The final roughness (Ra) of the three sections were 43, 43 and 55 microinches respectively. The corresponding mean peak to valley heights (Rz) were 214, 211 and 223. The surface energies were measured to be 17, 16 and 15 Dynes/cm. The three sections had excellent release characteristics. A load of only 4 to 5 grams was needed to remove a 0.25 inch wide strip of an adhesive tape from the three surfaces.

EXAMPLE 2

A stainless steel tube measuring 1.19 inch in diameter and 15.16 inches long was used as the substrate for the second example. The tube was grit blasted, then a tungsten carbide coating was sprayed onto the surface using a thermal spray process. The surface of the tube had a mean roughness (Ra) of approximately 770 microinches at this point. The tube was then sprayed with an S-110 Series black-pigmented mixture using a NAPA air spray gun. The coating was left to cure for five days at room temperature before being evaluated.

The final roughness (Ra) of this sample was 270 microinches, and the mean peak to valley height (Rz) was 1355 microinches. The roller had excellent release characteristics with a surface energy of 21 Dynes/cm, and a tape release load of only 2 grams for a 0.25 inch wide adhesive tape.

EXAMPLE 3

A stainless steel tube measuring 1.2 inches in diameter and 15.2 inches long was used as the substrate for this example. The tube was grit blasted and sprayed with a tungsten carbide coating as a base layer 17. The sprayed surface had a mean roughness (Ra) of approximately 770 microinches. Half of the tube (Section A) was then sprayed with a top coat 15 of the S-110 Series black-pigmented mixture using a NAPA air spray gun. The same top coating 15 was brushed on to the second half (Section B) using a foam brush. The coating was left to cure for five days at room temperature.

The roughness (Ra) on the sprayed area (Section A) was 300–650 microinches. The mean peak to valley height (Rz)

was 1900–3600 microinches. This area had good release characteristics with a surface energy of 33 Dynes/cm, and a tape release load of 6 grams.

The brushed area (Section B) had an average roughness (Ra) of 400–800 microinches. The mean peak to valley height (Rz) was 2000–4000 microinches. This area had a surface energy of 38 Dynes/cm, and a tape release load of 1 gram.

EXAMPLE 4

Six stainless steel tubes measuring 1.2 inches in diameter and 4.0 inches long were used as the substrates for this example. The tubes were grit blasted and thermally sprayed with a base layer coating comprising tungsten carbide and metal alloys containing cobalt, nickel, chrome, boron and aluminum. The surface at this point had a mean roughness (Ra) of approximately 200–400 microinches. The tubes were then sprayed with an S-110 Series black-pigmented mixture using a Spray Systems automatic spray gun to form a top coating 15 in a thickness of approximately 0.001 to 0.003 inches. The coating 15 was left to cure for five days at room temperature.

The final roughness (Ra) of the tubes was 200–400 microinches, and the mean peak to valley height (Rz) was 1200–1700 microinches. This sample had good release characteristics with a surface energy of 24 Dynes/cm, and a tape release load of 7 grams. The samples worked well in releasing a new high-strength adhesive. This coating was determined to be the best of examples given above. The coating had the best combination of release, chemical resistance and durability at room temperature and at 70° C. (158° F.)

EXAMPLE 5

A steel roller with a diameter of 8.9 inches and a face length of 23.75 inches was thermally sprayed with a chrome oxide ceramic base layer 17 to a thickness of approximately 0.012 inch. The face was then ground to an average roughness (Ra) of 48 to 51 microinches ($\mu$in). The ground surface was then sprayed with the black S110 top coating 15, applying 0.002 to 0.003 inches in two passes. The roller was allowed to cure at room temperature for four days. It was then lightly polished with a 3 micron silicon carbide paper. The average roughness of the cured and polished roller was measured between 50 and 63 microinches. The roller is applicable to a die cutting operation where webs of self adhesive postage stamps are being perforated to separate the individual stamps. The adhesive side of the stamps is in contact with the surface of the roller. The S110 coating provides good release so the adhesive does not stick to the surface.

EXAMPLE 6

A steel roller with a diameter of 3.0 inches and a face length of 12.0 inches was arc-sprayed with a Type 420 stainless steel coating to a thickness of approximately 0.005 to 0.007 inches. The roller was then sprayed with 0.002 to 0.003 inches of the black S110 coating as a top coating 15. The roller was allowed to cure at room temperature for two days. The average roughness (Ra) of the cured roller was approximately 1000 microinches ($\mu$in). The roller had excellent release characteristics. A 0.25 inch-wide strip of adhesive used to measure tape release loads did not stick to the surface. In other words, the tape release load was zero (0) grams.

EXAMPLE 7

A glass-fiber epoxy composite tube with an outside diameter of 2.625 inches and a face length of 3.0 inches was coated with a base layer of black conductive gel coat material. The thickness of the gel coat was approximately 0.030 to 0.060 inches. The gel coat was then ground to an average roughness of approximately 8 to 15 microinches ($\mu$in). Half of the surface was then sprayed with 0.002 to 0.003 inches of the black-pigmented S110 coating. The other half was sprayed with the white S100 coating to approximately the same thickness. The tube was allowed to cure at room temperature for five days.

The average roughness (Ra) of the coated S110 section was between 100 and 150 microinches ($\mu$in). A tape release load of 4 to 8 grams was measured on this section. The section coated with S100 had a roughness of 70 to 100 microinches ($\mu$in) and a tape release load of 6 to 10 grams.

This has been a description of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

We claim:

1. A coated roller, comprising:

a core having an outer surface roughness of at least approximately 50 microinches;

an outer coating disposed around the core in a thickness of less than about 10 mils;

wherein said outer coating comprises i) a mixture of siloxane polymeric material and epoxy resin material ii) a water-based curing agent for said siloxane polymeric material and iii) a water-based curing agent for said epoxy resin material.

2. The coated roller of claim 1, further comprising a primer coating disposed over the core in a thickness of less than about 10 mils, said primer coating being disposed underneath the outer coating.

3. The coated roller of claim 2, wherein said primer coating comprises i) a mixture of siloxane polymeric material and epoxy resin material, ii) a curing agent for said siloxane polymeric material and iii) a curing agent for said epoxy resin material.

4. The coated roller of claim 1 wherein said outer coating is formed in a thickness of about 1 mil to about 4 mils.

5. The coated roller of claim 4, wherein said outer coating is formed in a thickness by spraying the outer coating on the roller in a number of passes using a spray gun.

6. The coated roller of claim 1, wherein the core is made of stainless steel, low carbon steel or aluminum.

7. The coated roller of claim 1, wherein the core is metal and has a surface roughness in a range from approximately 50 to approximately 1000 microinches.

8. The coated roller of claim 1, wherein said core comprises a glass fiber reinforced epoxy core.

9. The coated roller of claim 1, further comprising a base layer of tungsten carbide, ceramic or a gel coat disposed on the roller under the outer coating in a thickness at least as thick at the outer coating.

* * * * *